United States Patent [19]

Perechodnik

[11] Patent Number: 5,125,704
[45] Date of Patent: Jun. 30, 1992

[54] CAR GRILL ATTACHMENT

[76] Inventor: Zeev Perechodnik, 14200 Victory Blvd., #206, Van Nuys, Calif. 91401

[21] Appl. No.: 713,979

[22] Filed: Jun. 11, 1991

[51] Int. Cl.⁵ .............................................. B60R 19/00
[52] U.S. Cl. .................................... 293/115; 280/770; 248/345.1
[58] Field of Search ...................... 293/115, 1; 280/770; 248/345.1; 150/166; 267/73, 74, 153, 292

[56] References Cited

U.S. PATENT DOCUMENTS

| | | | |
|---|---|---|---|
| 4,817,902 | 4/1989 | Mason | 248/345.1 |
| 4,997,229 | 3/1991 | Swanson | 280/770 |
| 5,042,836 | 8/1991 | Swanson | 280/770 |

Primary Examiner—Robert R. Song
Attorney, Agent, or Firm—Lewis Anten

[57] ABSTRACT

A padded, elastic car grill band or detachably self-attaching strip snugly fits around the exposed, lower portion of a car grill to prevent injury when the lower portion of a car grill becomes exposed and a hazard when the car grill raises up with the car hood, as is true for some cars made by Mercedes-Benz. A connection (such as a rivet) is present at a lower middle portion of the band to act as a stop and prevent further travel by the band up the car grill. This ensures that it is only the lower portion of the car grill, including exposed edges, that is covered. The band may also be adjustable.

8 Claims, 2 Drawing Sheets

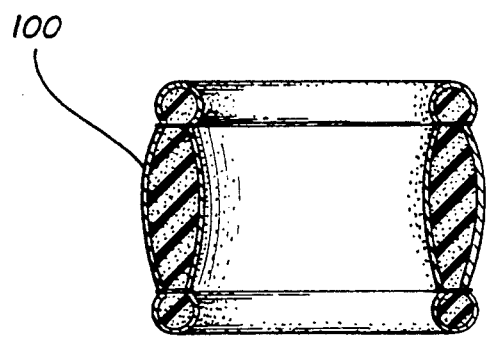
FIG. 5
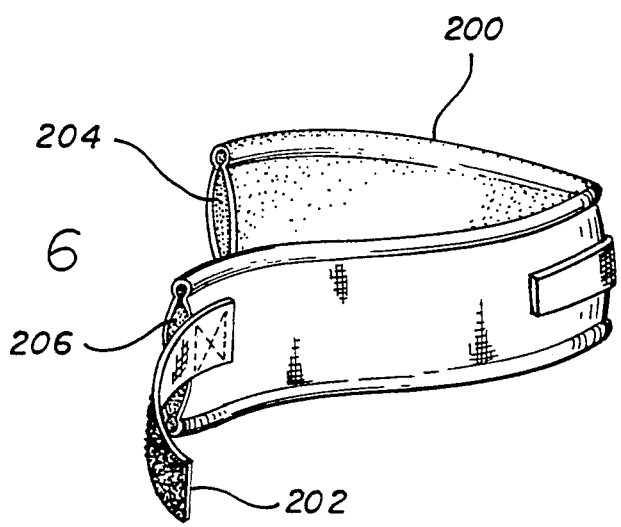
FIG. 6
FIG. 7
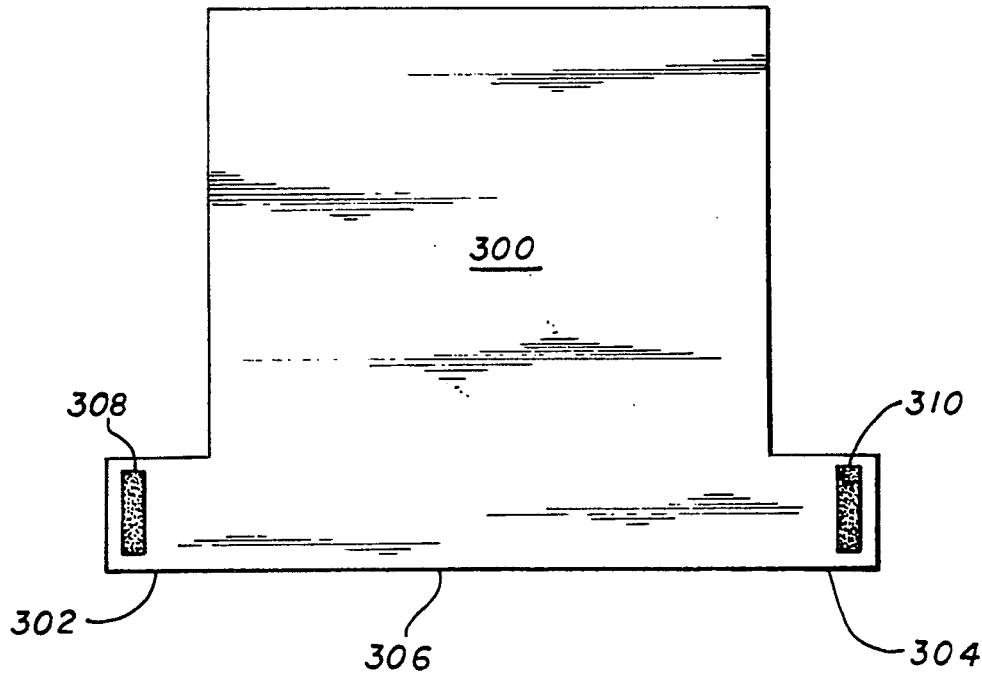

CAR GRILL ATTACHMENT

FIELD OF THE INVENTION

This invention relates to an attachment to the depending grill of cars which have the grill attached to the hood, for protecting the head of a mechanic or owner while performing mechanical repairs, and more specifically to a padded head protector that is removably attachable to the grill of a Mercedes-Benz.

BACKGROUND OF THE INVENTION

For some car models, particularly those manufactured by Mercedes-Benz, the car hood has the grill attached to the car hood. Thus, when the car hood is raised, the grill is also raised. In performing engine repairs upon such a car, quick upward movements by the mechanic can result in the mechanic striking his head against the raised grill. As the grill may have some sharp corners, cuts or lacerations may result to the head of the mechanic when the grill is accidentally struck.

While it is possible for the mechanic to exercise care while working over an engine, if startled or surprised, the mechanic may suddenly straighten up and strike his head. Since most cars do not have the grill depending from the hood, the owners or mechanics are used to lifting their heads without hitting their heads on the grill. A helmet worn on the head of the mechanic would protect the mechanic's head, but helmets are bulky, heavy, hot, and generally inconvenient.

SUMMARY OF THE INVENTION

The present invention may be summarized as a closed loop of padded fabric forming a band that fits around and covers the exposed bottom portion of a raised grill depending from the raised hood of a car. The band is of sufficient width and thickness to provide adequate cushioning, and fits snugly around the bottom perimeter of the grill. The band may also fit over a trunk lid having a depending portion.

In the preferred embodiment of the present invention, the band has a rivet or closure that connects two opposite sides of the band proximate a middle, lower portion. The rivet prevents the band from sliding up the grill, leaving the grill corners exposed.

OBJECTS OF THE INVENTION

It is an object of this invention to provide economical means by which head protection can be afforded a mechanic while working on a car engine or trunk, preventing injury.

It is another object of this invention to provide head protection means that is simple to use.

It is yet another object of this invention to provide head protection by means of an elastic, protective band that snugly fits around the grill of a car.

It is a further object of this invention to provide a head protection means that is removably attachable to a depending car grill or depending car trunk portion.

These and other objects of the present invention will be apparent from a review of the following specification and accompanying drawings.

BRIEF DESCRIPTION OF THE DRAWINGS

FIG. 5 shows a section view of the alternative embodiment of the present invention, generally along line 5—5 of FIG. 4.

FIG. 6 shows a perspective view of the band of the present invention with a hook and loop attachment for removably connecting the free ends of the band.

FIG. 7 shows in plan view an alternative embodiment of the present invention.

DESCRIPTION OF THE PREFERRED EMBODIMENT

Figure 1:
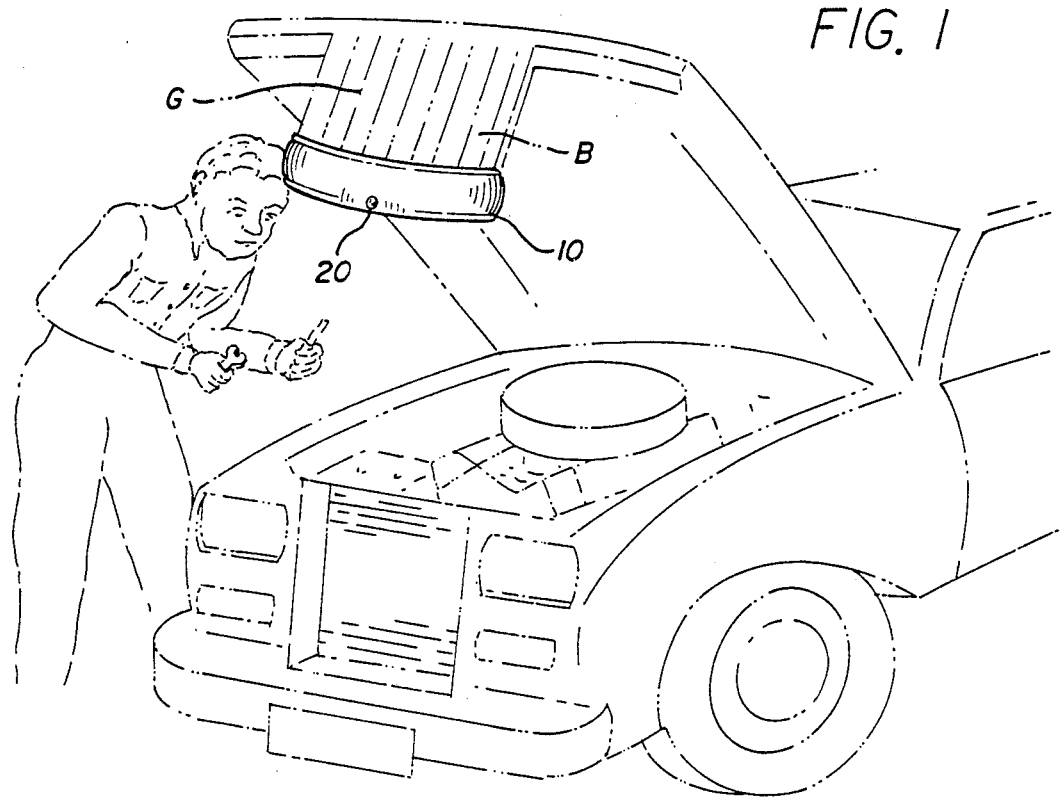
FIG. 1 shows the band of the present invention in place upon a raised car grill. The car and mechanic are shown in phantom.

As shown in FIG. 1, the present invention is a closed loop band 10 that fits over the depending, projecting portion of a raised car grill, G.

As shown in FIGS. 2-5, the band 10 is generally oval. The band 10 is made of NEOPRENE, which is an elastic, resilient material that provides a cushion for any forces that impact the band 10.

In the preferred embodiment, the band 10 is approximately six inches wide and one-quarter inch thick, but may be made wider or narrower, or thicker and thinner, according to needs or preferences. The band 10 is made from a strip of NEOPRENE, having its free ends permanently attached, so as to form a closed loop having an opening 11. Such attachment may also be achieved by sewing or stitching the free ends of the strip together, by fusing, gluing, or welding the free ends together, or by other conventional means of attachment. The band 10 may also be formed in one piece.

In order to cover the exposed top and bottom edges 16, 18 of the band 10, fabric coverings 17, 19 or other protective or decorative material may be sewn or attached to the top and bottom edges 16, 18. Seams 12, 14 are present along the top and bottom edges of the band 10 and arise from the attachment of these protective fabric coverings 17, 19. The fabric coverings 17, 19 extend along the entire top and bottom edges 16, 18 of the band 10. The seams 12, 14 and protective coverings 17, 19 add visual appeal to the band 10, and protect the top and bottom edges 16, 18 from fraying, unravelling, and wear and tear.

Figure 2:
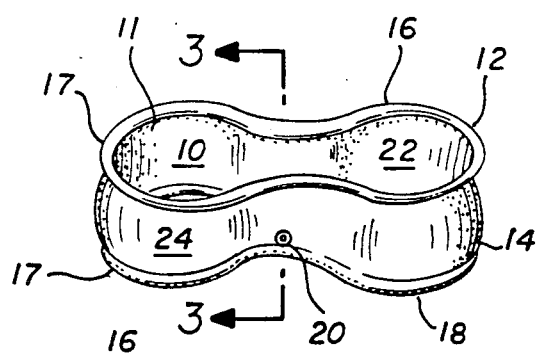
FIG. 2 shows a perspective view of the preferred embodiment of the present invention.
Figure 3:
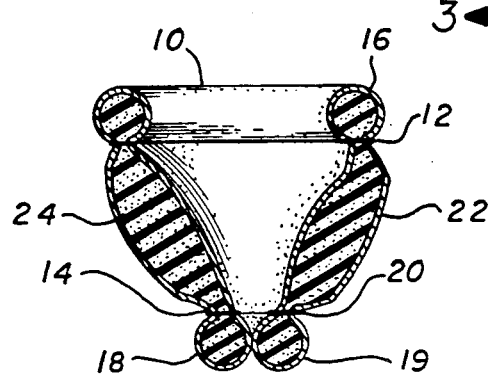
FIG. 3 shows a section view of the preferred embodiment of the present invention, generally along line 3—3 of FIG. 2.

As shown in FIGS. 2 and 3, a rivet 20, or other closure means, connects and closes opposite sides 22, 24 of the band 10. The rivet 20 makes its connection towards the lower edge of the band 10, approximate the midpoint of band 10. Thus, two approximately equal portions of the band 10 are defined on either side of the rivet 20.

The band 10 is fitted upon the car grill G by stretching the band so that the grill will fit within the opening 11 of the band 10. The band 10 is then placed upon the grill G. The elastic nature of the band 10 provides it with a snug fit circumferentially around the lower portion of grill G.

The rivet 20 prevents the bottom B of the grill G from passing through the band opening 11 and becoming exposed and a possible source of injury. This ensures that the band 10 stays at the lower most portions of the grill G as it cannot move further up on the grill G.

Other closure means may be used instead of the rivet 20. Also, all or part of the lower edge of opposite sides 22, 24 of the band 10 may be connected. Such closure means include heat fusing or welding, stitching or sewing, sonic welding, glue, or other conventional means of attachment.

While in the preferred embodiment NEOPRENE is used to construct the present invention, other fabrics or padded materials may also be used.

It is currently contemplated that the band 10 should be constructed to provide the following circumferential lengths: forty-eight inches, forty-nine inches, fifty inches, fifty-nine inches, sixty inches, and seventy inches. These circumferential lengths fit the depending grills of several models of Mercedes-Benz cars, and may fit grills of cars produced by other manufacturers. In the following lists, the size of the band used on a particular Mercedes-Benz car is determined more by the chassis number (defined by the manufacturer or related entity) than by the model number. The appropriate model number for a particular band 10 can be marked upon the band 10 for easy reference.

The forty-eight inch circumference band 10 fits the following models of Mercedes-Benz cars: 250S, 250SE, 280S, 280SE, 280SEL, 280SE 4.5, 280SEL 4.5, 300SEL, 300SEL 3.5, 300SEL 4.5 and 300SEL 6.3. The forty-nine inch circumference band 10 fits the following models of Mercedes-Benz cars: 190c, 190D, 200, 200D, 220b, 220Sb, 220SEb, 220SEC, 220SE Convertible, 230, 230S, 250SEC, 250SE Convertible, 280SEC, 280SE Convertible, 280SEC 3.5, and 280SE Convertible 3.5. The fifty inch circumference band 10 fits the following models of Mercedes-Benz cars: 220, 220O, 230.4, 230.6, 240D, 250, 250C, 280, 280C and 300D. The fifty-nine inch circumference band 10 fits the 600 series models of Mercedes-Benz cars.

The sixty inch circumference band 10 fits the following models of Mercedes-Benz cars: 280S, 280SE, 300SD, 450SE, 450SEL, and 450SEL 6.9. The seventy inch circumference band 10 fits the following models of Mercedes-Benz cars: 350SL, 350SLC, 380SL, 380SLC, 450SL, 450SLC, and 560SL.

Figure 4:
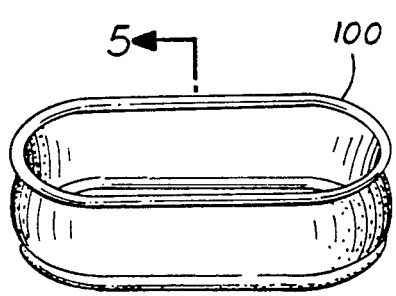
FIG. 4 shows a perspective view of an alternative embodiment of the present invention.

An alternative embodiment of the band apparatus 100 of the present invention is shown in FIGS. 4 and 5 which does not comprise a closure. The band 100 may also be formed as shown in FIG. 6 by an adjustable self-attaching strip 200 of cushioning material that may be wrapped or fitted over the exposed lower portion of a raised car grill G. Such adjustable self-attachment is accomplished by providing adjustable connectors 202 so that one end of the strip 204 can be disengagably attached at or near the other end of the strip 206. Among the many connectors for removable self-attachment that can be used include: hook and loop fasteners, snaps, lockpins and brackets, zippers, buttons and holes, and buckles. Other conventional means of removable self-attachment may also be used. FIG. 6 shows the band apparatus 10 of the present invention incorporating a hook and loop structure as the adjustable connectors 202.

Such a padded strip can be removably affixed to the lower portion of a raised grill by circumferentially wrapping the strip around the exposed lower grill portion. A free end of the strip 204 is then attached near or to the other free end 206 so that the band so formed is slightly stretched. The stretching of the band provides a snug fit around the grill and holds the band in place by friction. The rivet (not shown) or other closure is present proximate the lower middle portion of the self-attached strip 200 so that the band so formed will not ride up on the grill. Markings or indications may be placed on the connectors 202 or strip 200 to show the size of the band formed, or the car model which the band or strip 200 fits, when connected as marked.

In removing the self-attached strip 200 from the grill G, the strip 200 can be disengaged at the self-attached portion, or slightly stretched and slid off the grill. If the strip 200 is not disengaged from itself, the still TM-formed band can be used in the same manner as the previously described band 10 when used again. Car grills of the same or similar size can be fitted with the still-formed band in the same manner as for a permanently self-connected band 10.

As shown in FIG. 7, a further alternative embodiment is realized by a sheet of padded material 300 having short flaps 302, 304 to each side of the back edge 306. The sheet 300 covers the front and back sides of the grill G. The side flaps 302, 304 of the sheet's back edge 306 are wrapped around the sides of the grill G and removably attached, as by hook and loop fasteners 308, 310, to the sheet 300 on the front side of the grill G. The corresponding fasteners to the flap fasteners 308, 310 face away from the viewer in FIG. 7 and are not shown. The bottom of the grill G is then covered by the sheet 300 and protects those who accidentally strike it from injury.

The present invention may also be used upon other parts of an automobile, such as the exposed lower portion of a car's trunk, such as, for example, are present in some models of cars made by Mercedes-Benz and Cadillac.

While the band 10 of the present invention has been described in terms of certain embodiments, certain changes to or adjustments of aspects or characteristics of the present invention may be made without departing from the invention and the inventive concept thereof.

What is claimed is:

1. An apparatus for attachment to a car grill attached to a car hood, comprising:
   a band, said band forming a closed loop, made of padded or cushioning material, and being sufficiently large enough to removably attach to a car grill.

2. The apparatus as set forth in claim 1, wherein said band is elastic.

3. The band as set forth in claim 1, further comprising:
   closure means for closing at least a portion of the bottom of said band.

4. The attachment apparatus as set forth in claim 1, wherein said attachment apparatus further comprises:
   adjustable attachment means for attaching said apparatus to the car grill, said adjustable attachment means capable of adjusting the circumference of said closed loop of said band.

5. A car grill attachment for protecting a person from injury arising when striking a raised grill of the hood of a car, comprising:
   a band, said band made of cushioning material or fabric and removably attachable to the raised grill of a car;
   closure means, said closure means closing at least a portion of the bottom of said band by attaching opposite sides of said band; and
   adjustment means, said adjustment means attached to said band and allowing the circumference of said band to be changed.

6. The car grill attachment of claim 5, wherein said closure means comprises a rivet.

7. The cushion means of claim 5, wherein said adjustment means comprises hook and loop attachments.

8. The cushion means of claim 5, wherein said adjustment means comprises a strap.

* * * * *